July 21, 1964 D. Z. HARTRANFT 3,141,327
FORCE MEASURING INSTRUMENTS
Filed Feb. 13, 1962
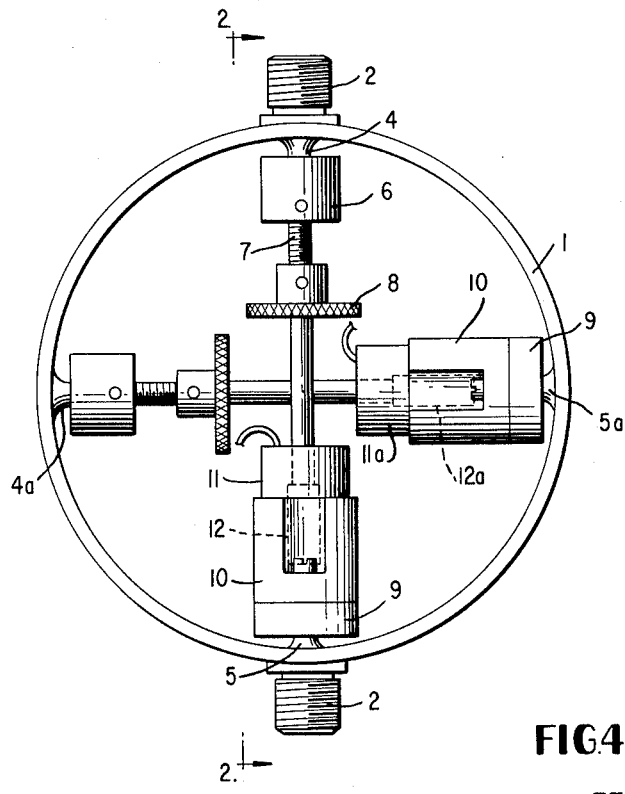
FIG.1
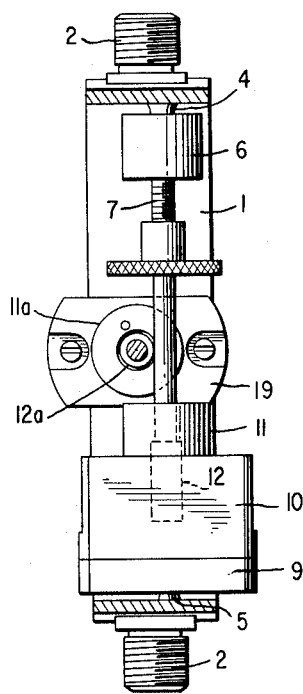
FIG.2
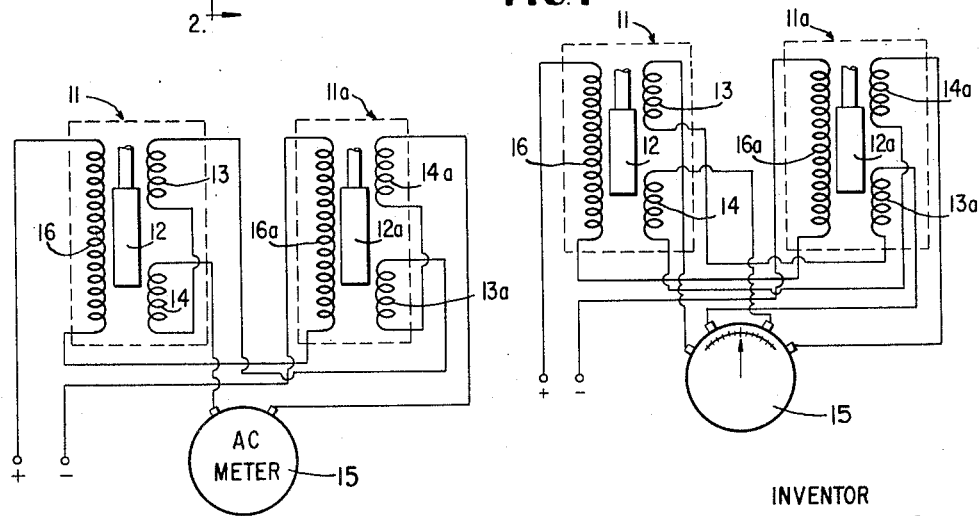
FIG.3
FIG.4
INVENTOR
DONALD Z. HARTRANFT
BY Pennie Edmonds Morton
Barrows & Taylor
ATTORNEYS United States Patent Office 3,141,327
Patented July 21, 1964

3,141,327
FORCE MEASURING INSTRUMENTS
Donald Z. Hartranft, 2615 Carlton Court, York, Pa.
Filed Feb. 13, 1962, Ser. No. 172,939
4 Claims. (Cl. 73—141)

This invention relates to improvements in force measuring instruments of the proving ring type.

The principal object of the invention is to provide an instrument of this class which is not affected by changes in atmospheric temperature.

A further object of the invention is to provide a force measuring instrument of this type wherein a correct reading of the applied force is at all times shown on a suitable gauge or recording instrument.

In the following specification and drawings I have illustrated a preferred embodiment of my invention and in the said drawings:

FIG. 1 is a side elevation of a proving ring force measuring instrument equipped with my invention;

FIG. 2 is a side elevation at right angles to FIG. 1;

FIG. 3 is a wiring diagram of the instrument shown in FIGS. 1 and 2 for connection to an A.C. meter; and FIG. 4 is a wiring diagram of the instrument which is employed in connection with a balanced instrument.

Referring to the drawings, 1 indicates the proving ring of the standard type such for instance as shown in U.S. Patent No. 1,648,375. Standard proving rings of this type consist of a ring of steel whose deflection under force through tension or pressure is accurately representative of the force applied. In the drawings the ring itself is numbered 1 and fixedly attached to the ring at diametrically opposite points are threaded lugs 2 for attachment of the ring to the two points whose separation or approach is to be measured by the force applied. The lugs 2 are fixedly attached to the outside of the ring and projecting inwardly in line with the center of the ring are fixtures 4 and 5 for the force indicating attachments. The attachment 6 consists of an internally threaded sleeve having a lock screw for fixing the screw threaded spindle 7 of the measuring instrument in the position to which it is adjusted by the operation of the knurled nut 8 attached to the screw. The attachment 5 consists of an oblong base 9 upon which is mounted the magnetic shielding casing 10 of the coil of differential transformer 11. The spindle 7 which is of nonmagnetic material projects into the coil, and attached to the end of the spindle is a magnetic core 12 which is of a length such that at the zero position of the instrument 15, the core is midway between the two coils 13 and 14, respectively, of the differential transformer.

Attached to the inner surface of the ring at points midway between the fixtures 4 and 5 are similar fixtures 4a and 5a on which are mounted respectively a spindle for the core 12a of a second differential transformer 11a and the transformer itself which are similar in all respects to those previously described.

FIG. 3 shows one wiring diagram of the transformers and the attached instrument. The primary coils 16, 16a of the two transformers are connected in series to the opposite side of the source of power as indicated, and four secondary coils are connected in series and to the recording instrument 15 which may be a volt meter calibrated in pounds or other units as may be desired for the particular purpose for which the instrument is to be used.

In use the instrument is initially adjusted to zero position by turning the knurled nuts 8 to thereby position the cores of the two transformers in their middle or neutral position. The coils 13 and 13a are wound in the same direction and the coils 14 and 14a are wound in the same direction but opposite to the direction of the coils 13, 13a. It will be noted that the coil 13 is adjacent the center of the ring and the coil 13a is adjacent the ring itself, while the coil 14a is adjacent the center and the coil 14 adjacent the ring.

When the instrument reads zero with all four coils of the secondary circuit in series, as shown, the instrument should retain its zero reading notwithstanding temperature changes. Changes in temperature will affect the circumference and hence the diameter of the proving ring, making it larger upon an increase in temperature and smaller upon a decrease in temperature. Upon an enlargement of the ring the cores of both transformers will be pulled out, that is, toward the center of the ring, thus placing more turns of the two coils 13 and 14a nearest the center of the ring in the magnetic field. The movement of the cores will also of course decrease the number of turns of the coils 13a and 14 adjacent the ring which are in the magnetic field, and as the coil adjacent the ring of each transformer is wound in the same direction as the coil adjacent the center of the ring of the other transformer the increase in the number of effective turns of one coil will be exactly compensated for by the decrease in the number of effective turns of the other coil, and the expansion of the ring by an increase in temperature will not alter the zero setting of the instrument.

A different effect takes place when the ring is distorted by tension or compression applied to the lugs 2. When the ring is expanded by tension the core 12 of the transformer 11 will be moved toward the center of the ring but the ring will be equally contracted in the transverse direction and the core of the transformer 11a will be shifted further into the coil away from the center of the ring.

The effective turns of the like coils 13 and 13a will be increased and the effective turns of the coils 14 and 14a will be decreased so that the change in the voltage of the induced current in the circuit of the secondary coils will be twice that produced by the same distortion of a ring equipped with one differential transformer.

FIG. 4 shows a modified circuit for the two differential transformers. As here shown the instrument is of a type which shows a zero reading when exactly the same voltage is applied to two independent circuits in the instrument. One circuit contain coils 13 and 13a while the other contains coils 14 and 14a. When both cores move in the same direction upon expansion or contraction of the ring due to temperature changes the total number of effective turns of the coils in the two circuits will remain unchanged. When, however, one core moves inwardly and the other moves outwardly as occurs when the ring is distorted by a force to be measured the difference in the voltage of the current induced in the two circuits will be double the change in voltage of the current induced in the circuit of one differential transformer.

Proving rings have heretofore been equipped with a single differential transformer with a movable core connected across the diameter in line with the lugs to which the movable elements are attached. In such instruments the magnitude of the applied load is indicated by the difference in the voltage of the current induced in the secondary coils. Such instruments are however affected by the atmospheric temperature, necessitating a zero adjustment for each use of the instrument. Such adjustments add greatly to the likelihood of inaccuracy in the use of the instrument. With the instrument of this application this zero adjustment remains permanent for all changes in temperature, and the instrument of this application also has the advantage that the voltage change for the same distortion of the ring is twice as great.

I claim:

1. In a proving ring subject to distortion by externally applied forces, means for indicating the extent of such distortion comprising a differential transformer mounted within said ring, said transformer having two secondary coils arranged coaxially with the common axis extending radially of said ring, a core for said coils having one end attached to a diametrically opposite point within said ring, said core extending radially from its point of connection into said coils, said core being normally positioned when said ring is not distorted equally within said secondary coils and a second differential transformer of like construction mounted within said ring with the axes of its secondary windings at right angles to the axes of the windings of the first mentioned differential transformer, the secondary coils of the two transformers being so connected that upon expansion or contraction of the ring upon change in temperature the radial movement of the two cores will produce equal and opposite effects on the current induced in the coils.

2. The proving ring of claim 1 wherein the coils of the two transformers having windings of the same direction are oppositely placed with respect to the center of the ring.

3. The proving ring of claim 1 wherein the coils of the two transformers are so arranged and connected that the change in the current induced in the secondary coils of both transformers upon distortion of the ring by externally applied force is the same.

4. The proving ring of claim 1 wherein the secondary coils of both transformers are connected in series.

References Cited in the file of this patent

UNITED STATES PATENTS

| | | |
|---|---|---|
| 2,550,588 | Oberholtzer | Apr. 24, 1951 |
| 3,035,240 | Starr | May 15, 1962 |
| 3,044,029 | Pegram | July 10, 1962 |

OTHER REFERENCES

Article by MacGeorge: "The Differential Transformer for Control Indication," pp. 116–121, Product Engineering 1953 Annual Handbook.